United States Patent [19]
Gänger et al.

[11] 3,775,686
[45] Nov. 27, 1973

[54] METHOD OF AND APPARATUS FOR VOLTAGE TESTING OF HIGH-VOLTAGE EQUIPMENT AND ELECTRICAL MACHINES

[75] Inventors: Bertold Gänger; Roland Schuler, both of Wettingen, Swtizerland

[73] Assignee: Aktiengesellschaft Brown, Boveri & Cie, Baden, Switzerland

[22] Filed: May 24, 1972

[21] Appl. No.: 256,266

[30] Foreign Application Priority Data
June 15, 1971 Switzerland.......................... 8684/71

[52] U.S. Cl. ................................................ 324/54
[51] Int. Cl............................................. G01r 31/12
[58] Field of Search........................................ 324/54

[56] References Cited
FOREIGN PATENTS OR APPLICATIONS
798,993    11/1968   Canada................................. 324/54
447,753    8/1927    Germany............................. 324/54

*Primary Examiner*—Gerard R. Strecker
*Attorney*—Ralph E. Parker et al.

[57] ABSTRACT

A method of testing the strength of insulation on electrical equipment and electrical machines at voltages higher than those to which the insulation is subjected in normal operation in which the testing is carried out under enhanced environmental conditions established by enclosing the insulated parts to be tested within a flexible transparent gas-tight envelope filled out with an electronegative gas, such as sulphur hexafluoride or Freon or other fluorocarbon based gas, or a gas/air mixture, to a pressure slightly in excess of atmospheric.

3 Claims, 1 Drawing Figure

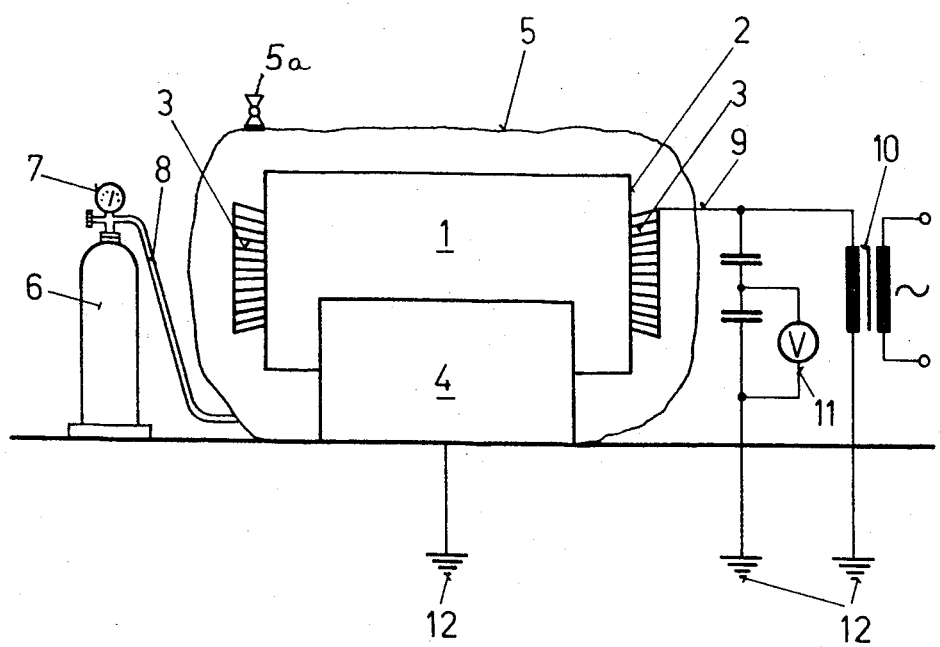

METHOD OF AND APPARATUS FOR VOLTAGE TESTING OF HIGH-VOLTAGE EQUIPMENT AND ELECTRICAL MACHINES

The present invention is directed to an improved method for the voltage testing of high-voltage equipment and electrical machines, and at higher voltages than those occuring in normal rated service, and to a novel apparatus for carrying out the method.

With the total-impregnation methods available today for insulating stator windings, it is possible and usual to build the stator windings of high-voltage machines in a very compact manner, i.e., with small air clearances in the end-turns.

The known forms, however, have a number of shortcomings. The compact construction presents particular problems when voltage-testing such machines because the insulation becomes fully effective only after impregnation, and for this reason a voltage test at a suitably high test voltage, which must be substantially higher than the voltage occurring in rated operation, is not possible before the insulation has been cured. The insulation strength can therefore be determined during voltage testing only after the individual parts of the winding have been installed and the impregnation has hardened. The insulation strength with regard to the insulation between the individual conductors fitted in the stator and the stator iron must be checked with as high a test voltage as possible. Only in this way can faults in insulation and manufacture can be detected with sufficient reliability.

In general, however, the air clearances in the end-turns are not large enough for the necessary high test voltages, and discharges occur at the test voltage, both between neighboring parts of the winding and to earthed components, such as elements supporting the end-windings, etc.

The principal object of the invention is to provide an improved method and apparatus for carrying out the method which does not have the disadvantages of known solutions.

This objective is achieved in that the critical parts of the insulation are enclosed by a gastight envelope, after which the air present inside this envelope is at least partially evacuated and then the space enclosed by the envelope is filled with an electronegative gas or gas/air mixture under slight positive pressure thus to enhance the environment, whereupon the tested voltage is applied to the parts of the insulation to be tested, and when the voltage test is completed the test voltage s disconnected, the gas or gas/air mixture is extracted and the gastight envelope is removed.

The advantage of the method according to the invention lies particularly in the fact that the external insulation strength at the end-turns is increased without enlarging the air clearances in the end-winding and without costly constructions being necessary for testing the insulation strength, as would be the case, for example, if the insulation strength were to be tested in vacuo.

As part of the apparatus for carrying out the method of the invention it is of particular advantage to make the gastight envelope of transparent plastic sheet welded at the edges and to use sulphur hexafluoride ($SF_6$) as the electronegative gas to enhance the environment in which the strength of the insulation is tested.

Other fluorocarbon-based gases could be used, however, such as Freon for example.

Since sulpher hexafluoride ($SF_6$), by way of example, has a dielectric strength of about 2.4 times higher than that of air, an appreciably higher test voltage can be applied than in a normal air atomosphere. Owing to the good electrical properties of $SF_6$ it is also not necessary to use pure $SF_6$, as in most cases a gas/air mixture is sufficient for voltage testing, a mixture of 30–40 % $SF_6$ to 70–80 % air being adequate for the voltage test. A mixture of this order is the most economical.

It is of benefit if the electronegative gas or gas/air mixture is blown into the plastic envelope under slight positive pressure relative to atmosphere pressure, of 1.1 $kg/cm^2$ absolute, for example.

By using flexible, transparent plastic sheet material welded at the edges it is possible without great technical outlay to adapt the envelope to the structural features of each particular machine, and at the same time the winding can be observed continuously while the required test voltage is being applied to the winding.

One suitable embodiment of the invention will now be described and is shown in the accompanying drawing, the single view of which is somewhat diagrammatic and illustrates the stator of a dynamo-electric machine enclosed within a gas-filled transparent plastic envelope and electrically connected to the related voltage testing equipment located exteriorly of the envelope.

With reference now to the drawing, the particular electrical equipment to be voltage-tested is seen to be the windings on the stator frame 1 of a dynamo-electric machine. The windings carried mostly within the frame do, however, project from the opposite ends 2 in the form of end-turns 3 which are to be voltage-tested. The stator 1 is mounted upon a testing plinth 4 and is enclosed by a transparent gas-tight envelope 5 which is preferably made from transparent plastic sheet material, e.g., a polyester foil welded at the edges. The envelope 5 is provided with a valved outlet connection 5a to which an extraction pump, not illustrated, is then connected so that the air initially within envelope when installed over the frame 1 is at least partially evacuated. For filling the envelope with the electronegative gas, a gas cylinder 6 is provided in which the gas is stored in a compressed state. The gas can be sulphur hexafluoride ($SF_6$) and the gas cylinder 6 is connected up to the envelope 5 by means of a combined control valve and pressure-indicatng fitting 7 and flexible pipe 8. As an alternative to sulphur hexafluoride, other flurocarbon-based gases can be utilized such as Freon. The gas valve is then opened so as to fill the flexible envelope 5 until a slightly positive pressure relative to the surrounding atmosphere is attained, preferably about 1.1 $kg/cm^2$ absolute. Moreover, in lieu of utilizing wholly electronegative gas, a gas-air mixture at a slightly positive pressure relative to the surrounding atmosphere can be employed, for example, in a ratio of 30/70 or 40/60.

The stator windings 3 are connected by way of a high-voltage connection 9 to a voltage test circuit including a source of high voltage, e.g., test transformer 10, a voltage-measuring device 11 and earth connections 12 made to the stator frame 1, and to the voltage testing equipment. In order to simplify the disclosure, the details of the test instruments which are not essential to an understanding of the invention have been deleted from the drawing.

When the envelope 5 has been filled with gas from the storage cylinder 6 to the desired over-atmospheric pressure, the test voltage is then applied to the end-turns 3 of the stator winding by way of the high-voltage connection 9. Since the envelope 5 is transparent, the stator winding 3 may be continuously observed throughout the test which is of considerable advantage. After completion of the voltage test, the test voltage is disconnected from the stator windings, the gas within envelope 5 is then released, or extracted, and envelope 5 then removed from the stator frame 1.

As obvious modifications to the apparatus depicted in the drawing, the compressed gas cylinder 6 may be replaced with any other equivalent type of gas supply, and transformer 10 which serves as the source of the test voltage may be replaced with an equivalent source, for example, an electrical generator. Also, in addition to voltage-testing of the end turns of stator windings, the apparatus may be used equally as well for voltage testing of other high-voltage electrical equipment under enhanced environmental conditions.

We claim:

1. In the method of testing the strength of insulation of critical parts of electrical equipment and electrical machines at test voltages higher then those to which the insulation is subjected during normal operation the improvement comprising the steps of temporarily enclosing the critical insulated parts to be tested within a gas-tight envelope made from flexible transparent material, filling out said envelope with an electronegative gas or gas-air mixture to a pressure slightly in excess of atmospheric thereby to enhance the environmental conditions for the test thereafter applying the test, thereafter applying the test voltage to the critical insulated part and then removing the envelope.

2. Apparatus for testing the strength of insulation on critical parts of electrical equipment and electrical machines at test voltages higher than those to which the insulation is subjected during normal operation comprising a flexible, transparent gas-tight envelope, means supporting the insulated part to be tested within said envelope, means located exteriorly of said envelope for introducing an electronegative gas or gas/air mixture into said envelope to fill it out to a pressure slightly in excess of atmospheric, a source of test voltage located exteriorly of said envelope, and means for connecting said test voltage to the insulated part within said envelope.

3. Apparatus as defined in claim 2 for testing the strength of insulation on critical parts of electrical equipment and electrical machines and wherein said envelope is made from transparent plastic sheet material welded at the edges.

\* \* \* \* \*

UNITED STATES PATENT OFFICE
CERTIFICATE OF CORRECTION

Patent No. 3,775,686          Dated November 27, 1973

Inventor(s) Bertold Ganger and Roland Schuler

It is certified that error appears in the above-identified patent and that said Letters Patent are hereby corrected as shown below:

Claim 1 - line 6 - (column 4) delete

"thereafter applying the test"

Signed and sealed this 16th day of April 1974.

(SEAL)
Attest:

EDWARD M.FLETCHER,JR.　　　　　　C. MARSHALL DANN
Attesting Officer　　　　　　　　　Commissioner of Patents